(12) United States Patent
Augsburger et al.

(10) Patent No.: US 6,633,807 B2
(45) Date of Patent: Oct. 14, 2003

(54) ENHANCED MODULE CHIPPING SYSTEM

(75) Inventors: Brett Augsburger, Auburn, AL (US); Eddie Burwell, Huntsville, AL (US); Frank Dudel, Huntsville, AL (US)

(73) Assignee: Audi Performance & Racing, Auburn, AL (US)

( * ) Notice: Subject to any disclaimer, the term of this patent is extended or adjusted under 35 U.S.C. 154(b) by 218 days.

(21) Appl. No.: 09/929,479

(22) Filed: Aug. 14, 2001

(65) Prior Publication Data

US 2002/0077739 A1 Jun. 20, 2002

Related U.S. Application Data (60) Provisional application No. 60/225,196, filed on Aug. 14, 2000.

(51) Int. Cl.[7] .................. G06F 19/00; G06F 12/14; G08B 5/22
(52) U.S. Cl. .................. 701/115; 711/100; 711/163
(58) Field of Search .................. 701/115; 711/103, 711/100, 163; 340/825.44, 825.27, 825.34, 825.31

(56) References Cited

U.S. PATENT DOCUMENTS

| | | | | |
|---|---|---|---|---|
| 4,431,988 A | * | 2/1984 | Molusis et al. | 340/825.22 |
| 5,218,622 A | * | 6/1993 | Fazel et al. | 375/240 |
| 5,436,621 A | * | 7/1995 | Macko et al. | 340/825.27 |
| 5,930,826 A | * | 7/1999 | Lee et al. | 711/163 |

* cited by examiner

Primary Examiner—Hieu T. Vo
(74) Attorney, Agent, or Firm—Renner, Otto, Boisselle & Sklar, LLP (57) ABSTRACT

A memory system for limiting access of a protected portion of a memory to a predetermined accessing device. The memory system includes a memory having a protected portion. The system further includes a control unit in communicative relation with an accessing device and the memory, wherein the control unit monitors the accessing device's pattern of access to the memory in order to determine if the accessing device is the predetermined accessing device and permits only the predetermined accessing device to access the protected portion of the memory.

20 Claims, 8 Drawing Sheets

ENHANCED MODULE CHIPPING SYSTEM

This application claims the benefit of U.S. Provisional Application Ser. No. 60/225,196 filed Aug. 14, 2000.

TECHNICAL FIELD

The present invention generally relates to the field of automotive controls. More particularly, the present invention relates to a system for readily modifying and improving the functionality and programming of an automobile's original engine control unit (hereinafter referred to as "ECU").

BACKGROUND ART

In modern automobiles the engine is controlled by an onboard computer, which is commonly referred to as the engine control unit or ECU. The ECU monitors a multitude of parameters and continuously makes corrections to various control points to achieve a desired performance profile. Some typical profiles include maximization of fuel efficiency, maximization of engine power, or minimization of emissions output. These profiles are typically stored within the ECU's non-volatile memory as part of the engine control system software.

In many circumstances, automobile owners modify their automobile in order to improve the performance thereof. However, in order to take full advantage of such modifications, the ECU may also need to be modified, i.e., reprogrammed. Unfortunately, current "stock" ECUs (i.e., ECUs for use in an unmodified car) are not readily reprogrammed or upgraded. Therefore, it would be desirable to have an easy, rapid, and cost effective means to reprogram or upgrade the ECU's software in order to take full advantage of the modifications.

One present means to upgrade a stock ECU is to replace the ECU's onboard non-volatile memory with either a socket/flash memory chip or an entire flash memory module that plugs in to a socket installed in the automobile. However, both of these approaches may cause problems that can potentially disable the automobile. For example, contact reliability problems can arise. Over time, dirt or oxidation can build up on the contacts eventually resulting in a partial disconnect between the ECU and the chip or the module. If such a partial disconnect does occur, then the ECU likely is unable to read the flash memory. Additionally, the replaceable module may completely disconnect from the socket. This problem is exacerbated in the automotive environment due to the substantial vibration to which the module is subjected.

A second means to upgrade a stock ECU is to reprogram the ECU using the manufacturer's memory reprogramming protocol. However, in practice this is not feasible because the reprogramming protocol is proprietary. In addition, this means is not cost effective since the equipment necessary to perform the reprogramming is extremely costly. Finally, even with the equipment, it is unclear whether one can arbitrarily change the code being loaded into the ECU.

Still another approach to "upgrading" an ECU is to allow switching being two or more ECU programs without removing the ECU. A switch is installed on the dashboard and is wired back through the engine compartment into the ECU box onto a flash memory upgrade module. This switch allows a user to physically switch between the memory associated with the stock ECU and the new memory upgrade module, thereby switching the data memory lookups used by the ECU to control the engine operating characteristics. In this configuration, a user can switch between the normal performance program and, for example, a racing program simply with the flip of a dashboard mounted switch. This solution, however, also suffers from drawbacks. Specifically, this approach requires that physical modifications and rewiring be done to the automobile. Accordingly, this approach is neither quick nor inexpensive.

In addition to concerns with the ease and cost effectiveness of reprogramming or upgrading an ECU, the automotive after-market performance upgrade industry is concerned with the security of their upgraded code. If competitors can easily obtain the system software, they require less engineering design effort to produce a similar performance profile and thus may be able to sell their product at a lower price. Therefore, in conjunction with upgrading or reprogramming an ECU, it is desirable to provide a mechanism for minimizing the risk that a competitor will have the ability to copy the upgraded software.

The current industry practice for software protection is to modify the address and data lines going to the ECU memory using what is called an "encryption socket". An encryption socket scrambles the order of the address and data lines simply by changing the circuit board connections on the memory upgrade circuit that is installed on the ECU. Furthermore, selected address lines are passed through a PAL or GAL type programmable logic device to implement what is effectively a lookup table or similar logic function that provides a one to one mapping of the input ECU address to the output memory address. This prevents one from directly reading out the flash memory chip to recover the unscrambled software since a programmer will not read out the data in the correct address order nor will the programmer unscramble the data bits.

However, this practice suffers from several problems. First, the encryption can be readily circumvented. Specifically, the flash memory along with its associated descrambling circuitry may be inserted into a programmer and the memory as seen by the ECU is read out directly since during the programmer read out process the descrambling circuitry is active and presents the programmer with correct descrambled data. More particularly, since the ECU must necessarily access descrambled data and since the ECU and the programmer utilize the same bus and control signals, the data presented to either the ECU or the programmer necessarily will be descrambled or unencrypted.

Second, the address and data line scrambling sequence can be determined via direct inspection of the circuit board. In turn, the function of the programmable logic can be deduced or characterized simply by feeding address test patterns into the device and monitoring the resulting memory address output. Since the most complex device currently on the market scrambles 8 address lines, only 256 tests would be required to characterize fully the operation of the programmable logic device. With these two pieces of information (i.e., the scrambling sequence and the characterization), the original unscrambled ECU program and data can be reconstructed.

Accordingly, it would be advantageous to have a quick and cost-effective solution for reprogramming a stock ECU in order to take full advantage of after-market improvements or modifications. It would also be advantageous to be able to protect the software accessed by the ECU from simply being read-out by a programmer, thereby minimizing the risk that a competitor can quickly and economically create a competing product.

SUMMARY OF THE INVENTION

In accordance with one aspect of the present invention, a memory system is provided for limiting access to a protected portion of a memory to a predetermined accessing device. The memory system includes a memory having a protected portion. The system further includes a control unit in communicative relation with an accessing device and the memory, wherein the control unit monitors the accessing device's pattern of access to the memory in order to determine if the accessing device is the predetermined accessing device and permits only the predetermined accessing device to access the protected portion of the memory.

In accordance with another aspect of the present invention, the memory system also includes a data multiplexer in communicative relation with the control unit and the accessing device, along with an address translator in communicative relation with the accessing device and the memory.

In accordance with still another aspect of the present invention, the control unit monitors either the accessing device's reads of the memory or the accessing device's writes to the memory.

In accordance with a further aspect of the present invention, the system includes a memory, which is encrypted. In conjunction therewith, the system includes a memory decryptor in communicative relation with the address translator, the data multiplexer, and the encrypted memory.

In accordance with still a further aspect of the present invention, an enhanced module chipping system is provided. The chipping system includes a memory and a control unit in communicative relation with the memory. The chipping system further includes an interface port in communicative relation with the control unit and the memory, wherein the interface port is configured for connection to a programming device for reprogramming either the memory or the control unit.

In accordance with still another aspect of the present invention, a method of modifying performance characteristics of an automobile is provided. The method includes modifying data stored in a memory of an engine control system and reprogramming an existing subsystem of the automobile that is in communicative relation with the engine control system. The method further includes using the existing subsystem to enable the engine control system to access the modified data.

DISCLOSURE OF INVENTION

The present invention will now be described in detail with reference to the drawings. In the drawings, like reference numerals are used to refer to like elements throughout.

Figure 1:
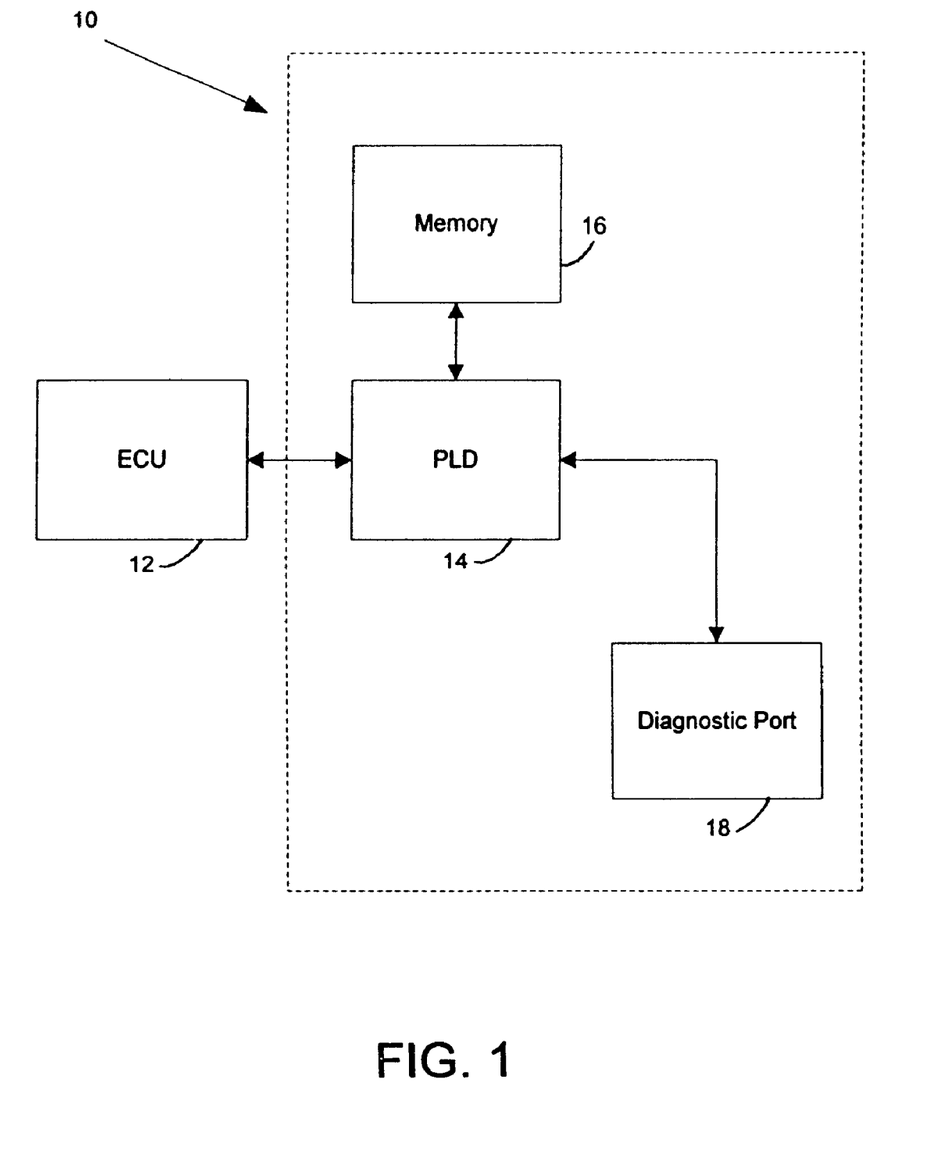
FIG. 1 is a block diagram of an architecture of an engine control system that includes a memory system in accordance with the present invention.

Referring first to FIG. 1, an engine control system 10 is illustrated. The engine control system 10 includes an engine control unit 12 ("ECU") that is in communicative relation with a programmable logic device or "PLD" 14. The PLD 14 is connected to and communicates with a memory 16 and an interface or diagnostic port 18. The operation of the diagnostic port 18 will be described in more detail below.

The ECU 12 functions to control operations of the automobile engine. The ECU 12 communicates with the PLD 14 in order to access information stored in the memory 16. Specifically, since generally engine operations can be tuned by modifying table lookups, the ECU 12 is accessing lookup tables stored in the memory 16 via the PLD 14. Therefore, in operation, the ECU 12 will control performance of the automotive engine in accordance with data the ECU 12 accesses from the memory 16.

Figure 2:
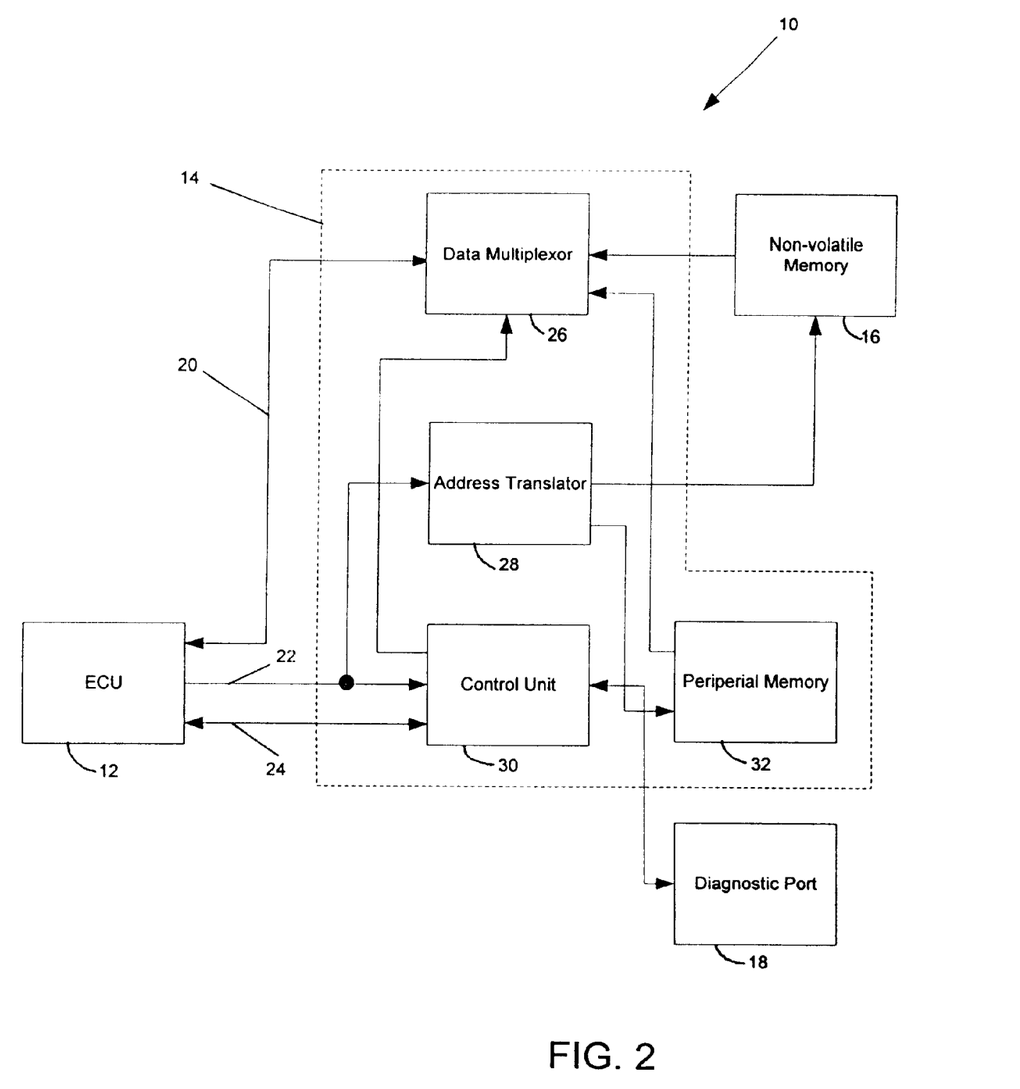
FIG. 2 is a block diagram showing in more detail elements that make up a memory system in accordance with the present invention.

Referring now to FIG. 2, the functional components of the PLD 14 are illustrated in block form. As discussed previously, the ECU 12 is in communicative relation with the PLD 14. In this embodiment of the present invention, the ECU 12 communicates with the PLD 14 via all data lines of a data bus 20, all address lines of an address bus 22, and a control bus 24. The data bus 20 connects the ECU 12 to a data multiplexer 26. The address bus 22 connects the ECU 12 to both an address translator 28 and a control unit 30. The control unit 30 is additionally connected to the ECU 12 via control bus 24, and is connected for control purposes to the data multiplexer 26. In this embodiment of the present invention, the data multiplexer 26 and the address translator 28 are further connected to both the memory 16, which can be any type of memory device such as flash memory, ROM, OTP, and RAM, and a peripheral memory 32.

The data multiplexer 26 functions to place data from either the memory 16 or the peripheral memory 32 on the appropriate data lines of data bus 20, thereby enabling the ECU 12 to access such data. Additionally, the data multiplexer 26 may hide or prevent access to certain protected address ranges based upon instructions from the control unit 30. The reasons for this additional functionality will be discussed in more detail below.

The address translator 28 generally performs its traditional function. Specifically, its main purpose is to remap the ECU's 12 logical address to an internal address of either the memory 16 or the peripheral memory 32. In other words, in this embodiment of the present invention, the address translator 28 is used generally for bank switching.

The control unit 30 is connected to and communicates with the data multiplexer 26, instructing the data multiplexer 26 with respect to providing the ECU 12 access to certain address ranges. In addition, the control unit 30 monitors activity on the address bus 22. The control unit 30 performs such monitoring in order to ensure and provide proper operating modes for the PLD 14.

It should be noted that the present invention uses all address lines of the address bus 22 and all data lines of the data bus 20 in its operation. Moreover, the present invention has access to control signals found on the control bus 24. Accordingly, the present invention has a better overview of the bus activity of the system 10 than was heretofore found. Specifically, unlike its predecessors, the present invention is capable of monitoring the progress of each read of memory 16 and further is capable of differentiating between memory 16 and non-memory related bus activity.

The PLD's 14 ability to monitor the bus activity of the engine control system 10 enables the present invention to protect better the software and data resident on the PLD 14. More particularly, the control unit 30 monitors the bus activity in order to distinguish between an attempted access of the memory 16 by an actual engine control unit and attempted access by merely a programmer for purposes of pirating the data and software resident on the PLD 14.

Figure 3:
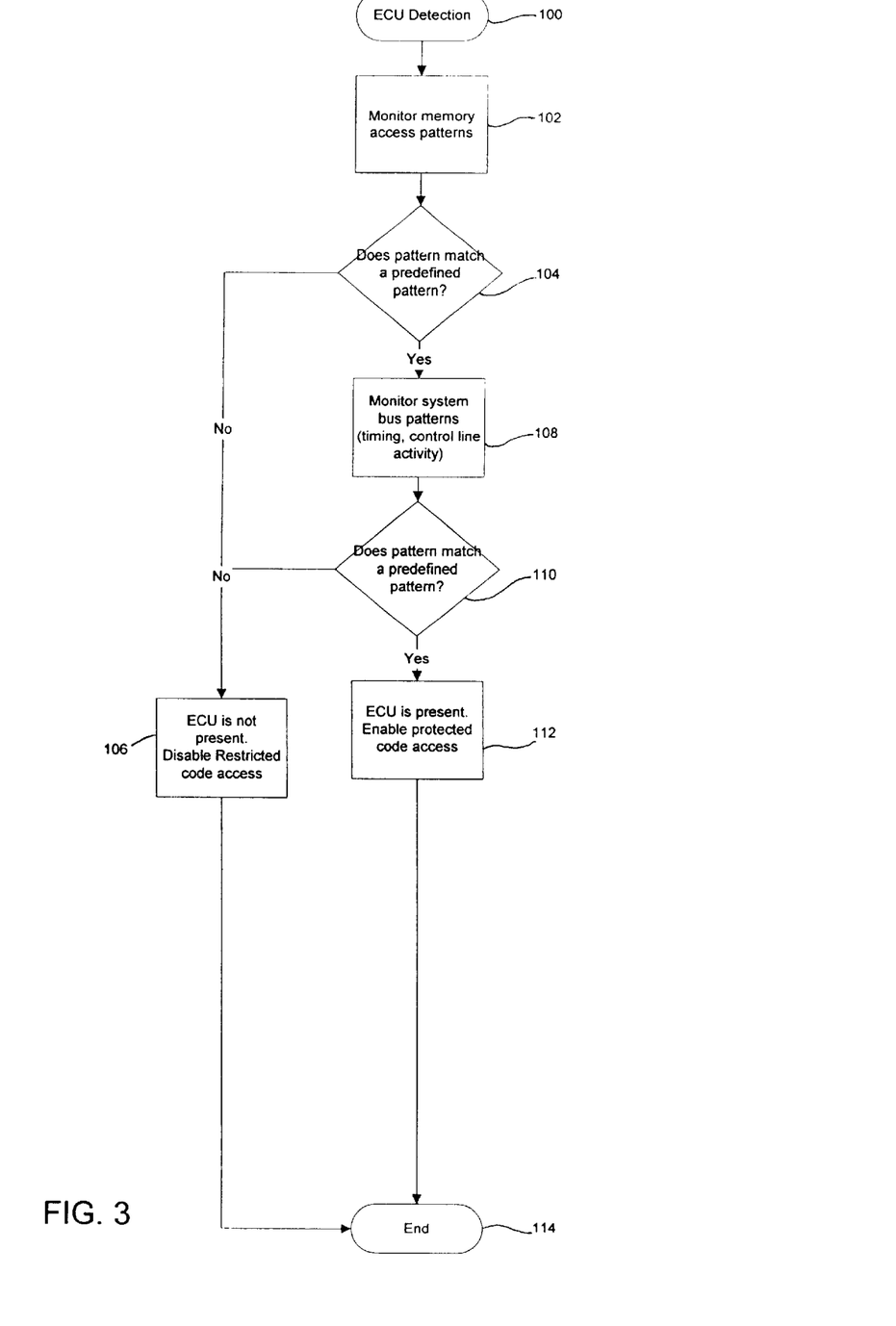
FIG. 3 is a flow chart illustrating the steps the memory system of the present invention implements in order to detect the presence or lack thereof of an engine control unit.

Referring now to FIG. 3, the process of differentiating between accessing of memory 16 by an ECU 12 or a programmer (not illustrated) is further detailed. In step 100, system bus activity is commenced. As is indicated in step 102, the control unit 30 monitors execution of a program by monitoring the access patterns of the memory 16. The control unit 30 is attempting to identify that the access patterns match a predefined pattern associated with preselected subroutines (see step 104). For example, the control unit 30 may have been programmed to recognize that a particular subroutine accesses a constant from a specific address within the memory 16. Accordingly, if the control unit 30 monitors an access instruction from this particular subroutine and then monitors an access to this specific address, the control unit 30 sets a flag indicating that the access is proper and thus presumably by the ECU 12 as opposed to a programmer.

If the memory access pattern does not match the predefined pattern, then the control unit 30 does not set the flag indicating access by an ECU. In this situation, as is indicated in step 106, the control unit 30 provides an instruction to the data multiplexer 26 to prevent or block access to specific data address space in memory 16 that is to be protected. Thus, the device that is attempting to access the memory 16 will only be able to retrieve data available to a "stock" ECU, and will not be able to retrieve data enabling the advantages of after-market improvements to the automobile.

If the memory access does match the predefined pattern, as mentioned above, the control unit sets a flag indicating that access to the memory 16 is presumably by the ECU 12. In this embodiment of the present invention, the control unit 30 actually monitors for a proper memory access pattern from 2 different subroutines. However, one skilled in the art will readily recognize that the control unit 30 could monitor the memory access patterns of any number of subroutines without departing from the scope of this invention. Alternatively, as opposed to monitoring the memory 16 access patterns, the control unit 30 could monitor writes to the RAM of system 10, such as writes to a variable holding engine speed.

Even if the control unit 30 implemented in this embodiment of the present invention determines that the memory access pattern matches the predetermined pattern, it does not immediately grant access to the protected address space within the memory 16. Instead, the control unit 30 further monitors the system bus activity for accesses to other peripheral devices (see step 108). Specifically, the control unit 30 is looking to see that read and write enable signals on the control bus 24 toggle when an enable line for the memory 16 is inactive. If the control unit 30 determines that the toggle pattern matches an expected pattern, as is indicated in step 110, then in step 112, the control unit 30 determines that the ECU 12 is present and provides a signal to the data multiplexer 26 enabling access to the protected address space of the memory 16. At this point, the detection of the ECU 12 is complete (see step 114).

Figure 4A:
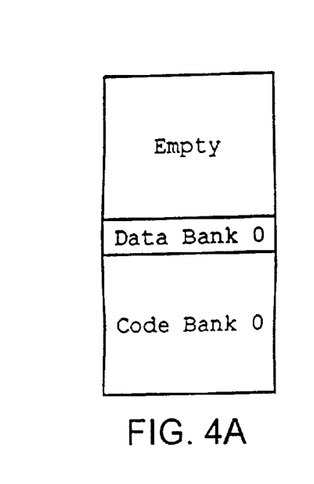
FIGS. 4A through 4D illustrate the portions of the memory seen by the ECU at various stages of the ECU detection process illustrated in FIG. 3.
Figure 4B:
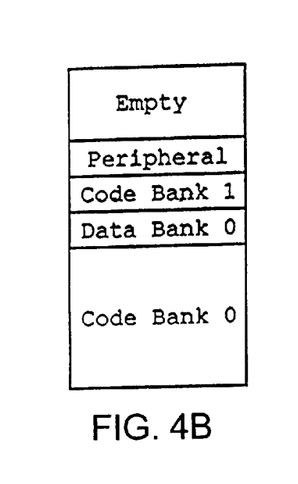
Figure 4C:
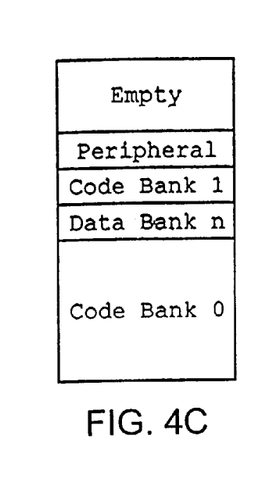
Figure 4D:
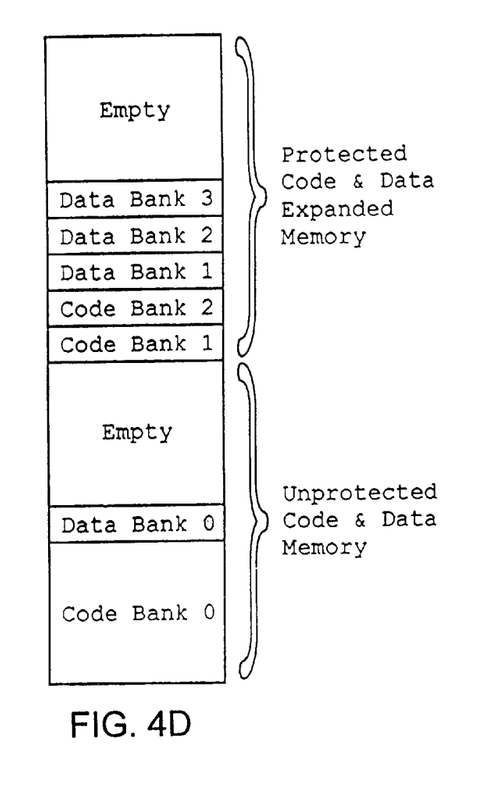

Referring now to FIGS. 4A through 4D, the address space of the memory 16 seen by the device (e.g., the ECU 12 or a programmer) accessing the memory 16 is better illustrated. Upon commencement of system bus activity, the accessing device is able to see the address space illustrated in FIG. 4A. In this case, the data and code accessible will be that generally available for controlling basic or stock engine operations. Upon completion of detection of the ECU 12, as is described above, the control unit 30 "unlocks" the protected address space of the memory 16. At this point, additional program code is switched into the system's 10 memory space, as is illustrated in FIG. 4B. This additional program code enables bank switching, thus enabling the ECU 12 to access additional data banks within the protected address space of the memory 16 (see FIG. 4C). FIG. 4D illustrates the internal memory map for the memory 16 that is available to the ECU 12 after the ECU detection process discussed above is complete.

One issue for which the above-described process must account is the effects of microprocessor instruction caching and pipelining. Specifically, a problem may arise if instruction caching and pipelining are not accounted for since a particular read of the memory 16 may be followed by additional instructions before the read of the memory 16 actually occurs. To combat this potential problem, a logic analyzer (not shown) can be used to detect an appropriate characteristic instruction and data fetching sequence that is unique to a particular subroutine and still accounts for the microprocessor caching and pipelining. Once this unique instruction and data fetching sequence is known, the control unit 30 can monitor accordingly in order to determine accurately whether a particular memory access is by the ECU 12 or a programmer.

Referring back to FIG. 1, the engine control system 10 includes diagnostic port 18, which is connected to the memory 16 and is configured so as to be capable of communicating with the memory 16. In one embodiment of the present invention, the diagnostic port 18 is an industry standard JTAG port that is implemented on the PLD 14.

The addition of the diagnostic port 18 enhances the flexibility associated with the present invention in a number of respects. First, the diagnostic port 18 enables in-system reprogramming of the memory 16. In order to reprogram, the diagnostic port 18 may be connected to a programming device (not shown) for purposes of downloading new code or data. It should be noted that the ability to reprogram is enabled as a result of the present invention's ability to completely isolate the memory 16 from the ECU 12 and the present invention's ability to control each and every address within the memory 16. Heretofore, reprogramming would not have been feasible because conventional replaceable modules included a logic device that intercepted and controlled only a portion of the available address lines within the system memory.

The ability to reprogram is particularly advantageous for older engine control systems. In the older systems, it may not be feasible or economical to redesign the engine control unit therein. In such case, the present invention would enable a user simply to replace the memory of the older system with the PLD 14, the memory 16 and the diagnostic port 18. In this manner, the user would not only upgrade the older system, but would also enable further reprogramming if desired.

A second advantage of the diagnostic port 18 is that it provides enhanced diagnostic capabilities. The control unit 30 can be configured to monitor a particular location in the memory 16 report when a particular subroutine is being executed. The ability to report to the "outside" world the execution of the particular subroutine is accomplished via the diagnostic port 18, which would have connected thereto appropriate equipment (not shown) for monitoring and recording the information transmitted from the control unit 30. This capability allows such functions as memory usage profiling and trip point setting, in addition to other functions that one skilled in the art will readily recognize.

A third advantage to the diagnostic port 18 as implemented in the present invention is the provision of the ability to remotely reprogram the memory 16 without having power supplied to the ECU 12. This enables simple reprogramming via a user's personal computer. In addition, the memory 16 can be reprogrammed or reloaded with encrypted data, further minimizing the potential for theft of the protected data.

Figure 5A:
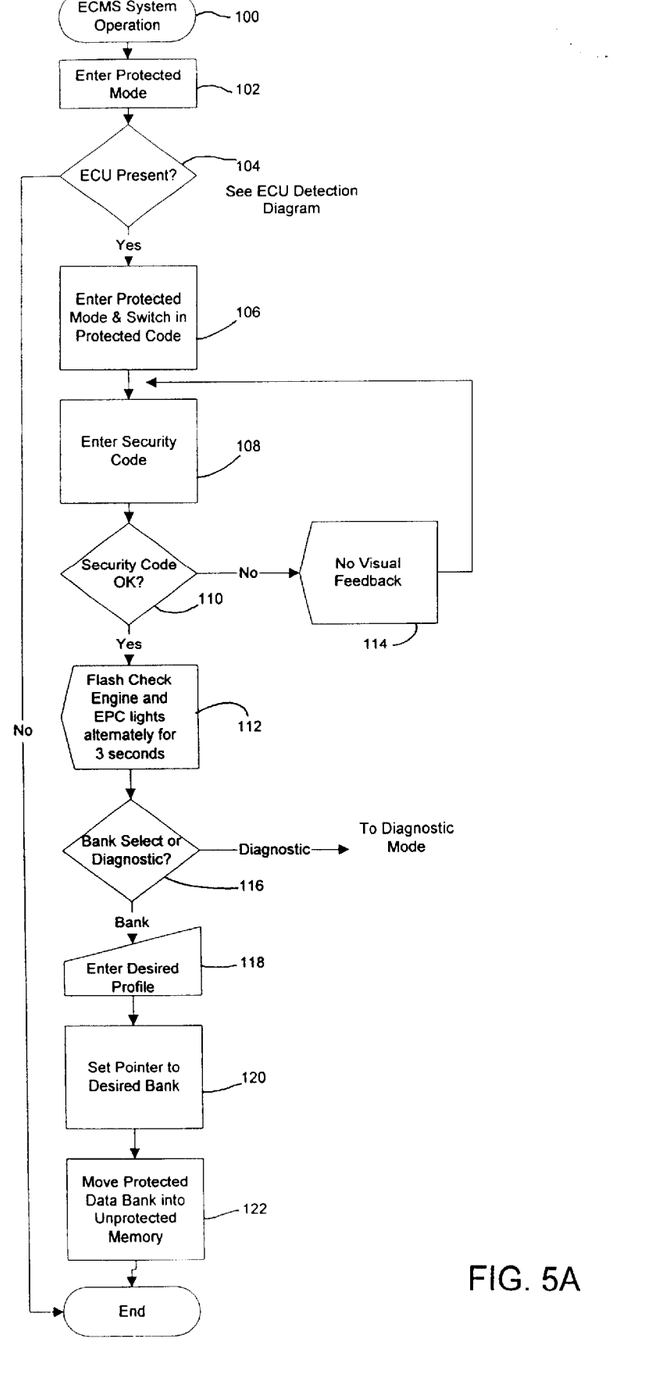
FIG. 5A is a flow chart illustrating the operation in a Bank Select mode of a memory system in accordance with the present invention.

Referring now to FIG. 5A, the operation of the present invention will be described in more detail. The system 10 commences operation in the protected or locked mode (see steps 100 and 102). During operation in the protected mode, the ECU 12 may access the standard performance profile, which is sufficient to allow the engine to operate as originally designed by the manufacturer. However, access to portions of the memory 16 that contain the enhanced performance data is denied.

Moving to step 104, the control unit 30 determines whether the memory 16 is being accessed by an ECU 12 or a non-ECU, in accordance with the process described above. If the control unit 30 determines that a non-ECU device is accessing the memory 16, then the system 10 continues operating in the protected mode. However, if the control unit 30 determines that the ECU 12 is accessing the memory 16, then the system 10 switches to an unlocked mode and transfers additional code into the memory of system 10, as is indicated in step 106. The transfer of additional code into the system memory allows access to additional portions of the memory 16 that contain the data needed for the enhanced performance profiles of the automobile engine.

In this embodiment of the present invention, an additional security measure is implemented. Specifically the present embodiment requires entry of a security code and verifies the accuracy of the security code before allowing access to the enhanced features (see step 110).

Unlike the prior art, the present invention does not require installation and wiring of additional operator devices in order to control the functionality of the system 10. Instead, existing controls in the automobile are used to control functionality of the invention, including the inputting of the security code.

Moving on with the description of the operation, in this embodiment of the present invention, a security code is entered using the set and cancel buttons of the cruise control. Specifically, in step 108, assuming a four digit security code (e.g., 5142), the user presses the set button five times in succession to signify the number five and the cancel button one time to complete the process of entering the first digit.

The second digit is entered in the same manner as the first digit, i.e., using the example, the set button is pressed once and the cancel button pressed once to enter the digit "1." This process is continued until the entire security code is entered and the system 10 moves to step 110 in order to verify the accuracy of the security code. If the system 10 verifies entry of a correct security code, a visual feedback is provided to the user signifying the successful entry (see step 112). In this embodiment of the present invention, the automobile's check engine light and EPC lights are used to provide the visual feedback. Specifically, in this embodiment, the system 10 will alternately flash the check engine light and EPC lights for 3 seconds, thereby indicating to the user that a valid security code has been entered. One skilled in the art should recognize, however, that any indicator late included in the automobile could be used without departing from the scope of the present invention. Moreover, the duration and pattern of the visual indication could also vary without departing from the scope of this invention.

If the code is entered incorrectly, then the system provides no visual feedback to the user (see step 114). The lack of visual feedback is designed specifically so that an unauthorized user cannot readily detect the presence of the upgrades to the system 10.

After the security code is entered, the mode of operation is selected in step 116. In the present embodiment, two modes exist; Bank Select mode and Diagnostic mode. Selection of each mode is once again accomplished using existing automobile controls. For example, pressing and holding the cruise control set button results in a flashing of the check engine light. The number of blinks corresponds to the mode of operation, with the blink pattern incrementing every 5 seconds until either the set button is released or no further patterns are available.

In Bank select mode, one of several engine characteristic profiles may be activated and run by the ECU 12, each profile being stored in a different "location." For example, if a racing profile is desired and that profile is stored in location three, similar to the selection of the mode, the user, in step 118, holds the set button and waits for the pattern of blinking of the check engine light that corresponds to the profile location (in this example, the check engine light would flash 3 times per second, which is indicative of location 3). After the user has entered the desired profile, in step 120, the control unit 30 will set a memory pointer indicative of the location within the memory 16 of the data needed by the ECU 12 in order to run the desired profile. The desired data will then be provided to the data multiplexer 26 for use by the ECU, as is indicated in step 122.

Figure 5B:
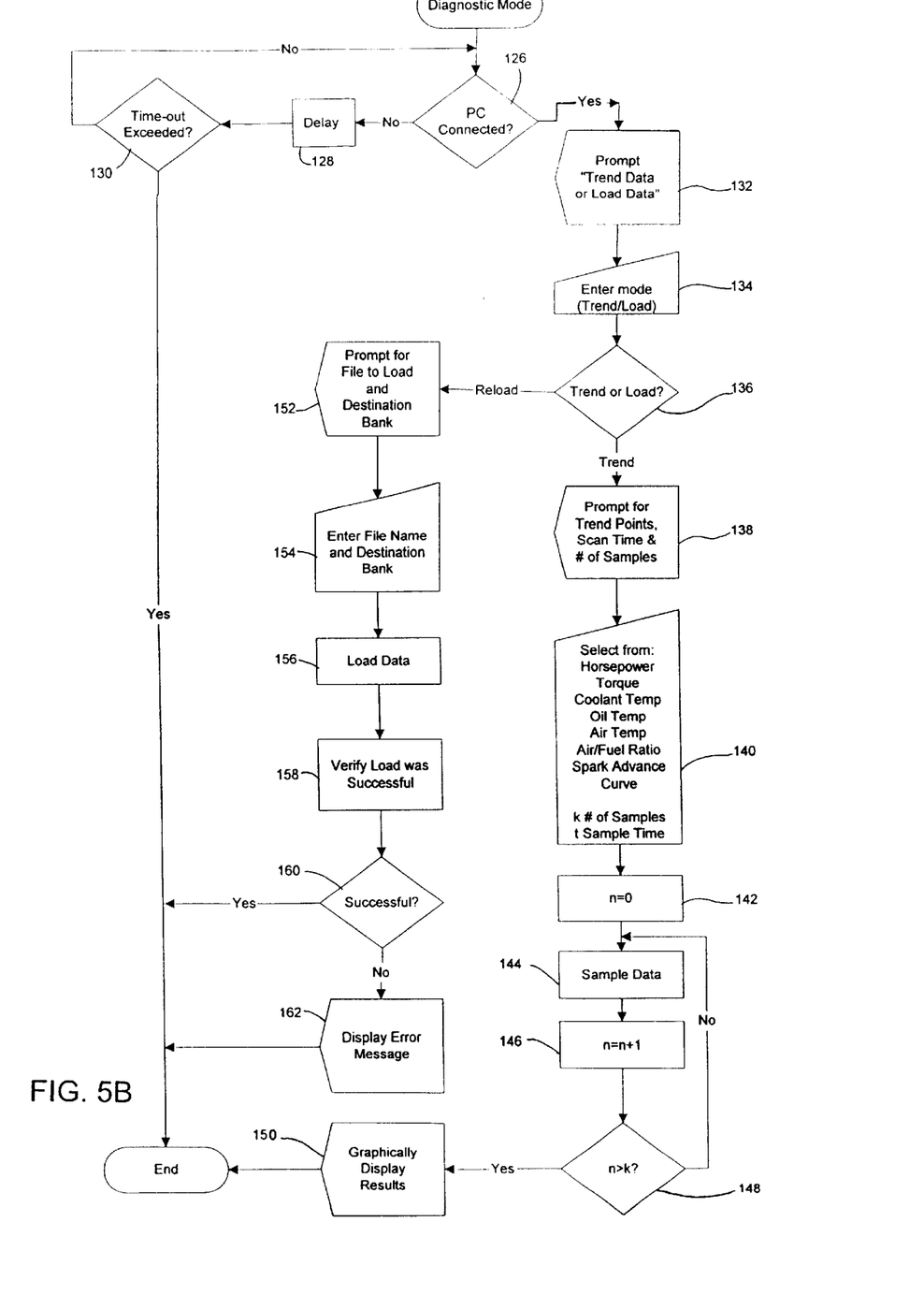
FIG. 5B is a continuation of the flow chart of FIG. 5A, illustrating in detail the operation in a Diagnostic mode of a memory system in accordance with the present invention.

Turning next to FIG. 5B, if the user in step 116 selects the Diagnostic mode, the system 10 proceeds to step 126 wherein the control unit 30 checks to ensure that an external diagnostic device, such as a personal computer, is present. If the control unit 30 fails to detect the presence of an external device it implements a preset delay in step 128 and then rechecks for the presence of the external device. This process will continue until the external device is found or until a predetermined amount of time has elapsed (see step 130).

If the system 10 times out in step 130, it returns to the normal mode of operation. However, if the external device is detected before timing out, the control unit 30 prompts the user for input on how to proceed in step 132. In this embodiment of the present invention, two diagnostic modes are available. These modes are termed Load Profiles and Trend System Data. In step 134, the user will select the desired mode, and the system 10 will continue operation based upon the user's selection (see step 136).

The Trend System Data mode allows selection of various performance points (e.g., engine horsepower, engine torque, coolant temperature, oil temperature, air temperature, air/fuel ratio, and spark advance) in which a user may wish to observe trends. In step 138, the system 10 will prompt the user for the performance points, scan time, and number of samples that are to be used in this mode of operation. In step 140, a pointing device that is available on the diagnostic device enables the user to select quickly and easily the points to be trended from a list of points displayed on the diagnostic device. In this embodiment of the present invention, a point is selected by marking the check box next to that point. The state of this check box will toggle each time the point is selected.

After the selection of performance points is complete, the system 10 initializes a counter in step 142 and begins taking samples of the selected data at the specified sample rate (see step 144). After each sample it increments the counter in step 146 and in step 148 compares the value of the incremented counter to the preselected number of samples the user selected. If the value of the incremented counter is less than the desired number of samples, the system returns to step 144 and continues to sample data. However, if the value of the incremented counter is greater than the desired number of samples, then the system moves to step 150 and graphically displays the results on the diagnostic device.

In order to assist the user in displaying the sampled data in a more meaningful manner, the diagnostic device may include additional tools (e.g., a zoom function, an ability to superimpose graphs on top of each other, etc.). Also, the diagnostic device may permit the saving of the sampled data and its graphical representation(s) may be saved on a removable storage device (e.g., a floppy disk) for analysis at a later time.

The Load Profile mode allows a user to load additional performance profiles into the memory 16 of system 10. If in step 136, the system 10 determines that the Load profile mode has been selected, it will prompt the user for the profile to be loaded and the location or bank of the memory 16 in which it should be loaded (see step 152). The profile may be completely new or may be designed to upgrade an existing profile. For example, profile 3 may currently contain a racing profile. This profile may be overwritten with an improved racing profile if so desired. After receiving the prompt, in step 154, the user will enter the profile name and memory location via the external or diagnostic device. The system 10 will then load the profile into the appropriate location within the memory 16 in step 156 and in step 158 will verify whether or not the load was successful. In step 160, if the system 10 determines that the profile load was successful, then it resumes normal operation. However, if in step 160 the system 10 determines that the profile load was unsuccessful, then it provides an error message to the diagnostic device for visual display to the user in step 162.

It should be noted that in an alternative embodiment of the present invention, the diagnostic mode of operation of the present invention may be limited to permitting a user to access diagnostic routines resident on the ECU 12. This feature is advantageous for users that do not possess or have access to the necessary external equipment, which would permit the user to perform such resident diagnostic routines. Examples of the diagnostic routines that may be resident on the ECU 12 are the throttle body alignment and the diagnostic trouble code erase.

Figure 6:
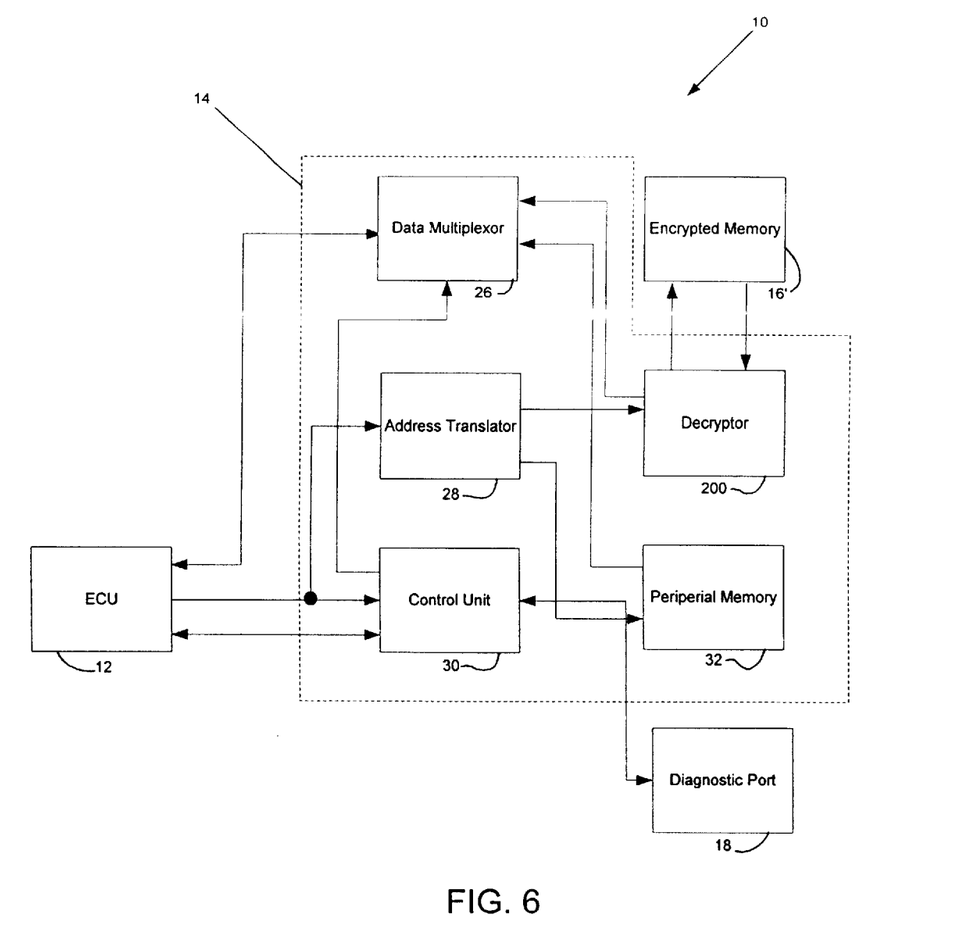
FIG. 6 is a block diagram illustrating a further embodiment of a memory system in accordance with the present invention, this embodiment including an encrypted memory.

Referring now to FIG. 6, a second embodiment of the present invention is illustrated. This embodiment includes a number of identical elements to the embodiment illustrated in FIG. 2. The differences between the 2 embodiments will be detailed in the description that follows.

The memory 16' in the embodiment of FIG. 6 is of similar character to the memory 16, including, however, encrypted data and code as opposed to "clear" data and code. A memory decryptor 200 is connected between the address translator 28 and the memory 16'. As its name suggests, the memory decryptor 200 decodes/decrypts data and code stored in the memory 16'. The memory decryptor 200 is also connected to the data multiplexer 26 and provides the decrypted data to the data multiplexer 26 for use by the ECU 12.

Figure 7:
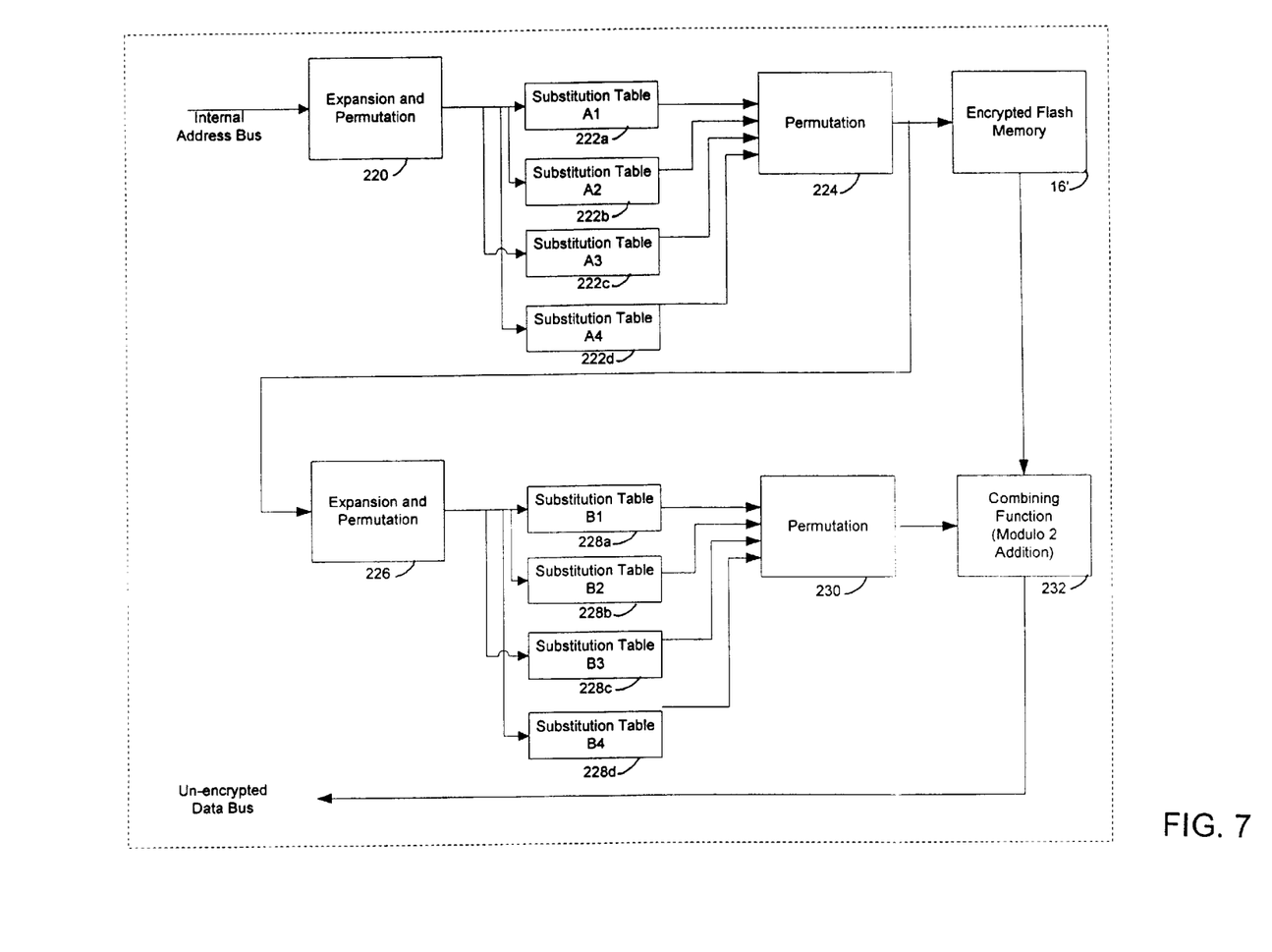
FIG. 7 is a block diagram of an architecture for data encryption, which may be implemented in a memory system in accordance with the present invention.

The encryption of the data and code to be stored in the memory 16' can be accomplished by any known method. FIG. 7 illustrates an architecture to implement one such method. For sake of clarity, the description of the encryption architecture that follows refers to discrete components. However, in practice, it is likely that the described architecture will be implemented on a single logic device, which is controlled/operated in accordance with the software loaded thereon.

As is shown, an incoming address is encrypted using an expansion and permutation module 220, in order to ensure that every address bit passes through at least one of substitution tables 222a–222d. It should be noted, however, that in some instances, particular address bits are passed through two of the substitution tables 222a–222d. The number of substitution tables illustrated in FIG. 7 are merely exemplary. In practice, the size and number of substitution tables employed will be determined by both the logic resources available and the desire to keep the encryption of the incoming address implemented in a single logic layer, thereby minimizing the time required to encrypt the address.

Multiple expansion tables are loaded in expansion and permutation module 220 and are used to reduce the logic complexity. The substitution tables 222a–222d are arranged in order that the number of bits output from the substitution tables 222a–222d equals the number of bits contained in the incoming address. However, individual substitution tables (e.g., 222a) may have a greater number of input bits than output bits due to the function of the expansion and permutation module 220. Those of substitution tables 222a–222d whose number of input bits equals the number of output bits are assigned a random one-to-one mapping. Those of substitution tables 222a–222d whose number of input bits is greater than the number of output bits are treated as if the number of input bits equaled the number of output bits, and the selection of the applicable substitution table 222a–222d is made based upon the duplicated input bits created by the expansion and permutation module 220.

The outputs of substitution tables 222a–222d are provided to a second permutation module 224. The second permutation module 224 performs simple bit scrambling, which ensures unique one-to-one mapping of the internal address of the memory 16' to the encrypted address. The second permutation 224 has as its output the encrypted address. The second permutation 224 provides the encrypted address to both the memory 16' and to a further processing path in order to calculate a data encryption value.

The calculation of the data encryption value is less complex than the address encryption step described above, even though the elements used to perform the calculation are substantially similar. The complexity of the calculation is minimized due to the fact that a one-to-one mapping of input bits to output bits is not required. Furthermore, the number of input bits processed can be reduced as a reflection of the smaller size of the data bus as compared to the address bus.

To calculate the data encryption value, the encrypted address output from the permutation module 224 is provided to another expansion and permutation module 226, which performs the same function as the expansion and permutation module 220. An output of the expansion and permutation module 226 is provided to a plurality of substitution tables 228a–228d. The bits that are processed by the substitution tables 228a–228d are selected in order to ensure that the input for each of substitution tables 228a–228d includes at least one bit of the outputs of each of substitution tables 222a–22d in order that an output from each of substitution tables 228a–228d is a function of every incoming address bit. The outputs from substitution tables 228a–228d are provided to a permutation module 230, which performs the same function as the permutation module 224. An output of permutation module 230 is then provided to a combiner 232, which combines the output (i.e., the data encryption value) with the data retrieved from the memory 16', with the resultant output being unencrypted data that is provided to data multiplexer 26.

In this embodiment of the present invention, the combiner 232 implements a modulo two addition function, although any reversible one-to-one function would be appropriate. An additional bit permutation may also be performed by the combiner 232, but is not required.

If a higher level of code/data security were desirable, multiple logic layers could be used. In other words, multiple levels of expansion and permutation modules, substitution tables, and permutation modules could be used, so long as the total computational time does not exceed the memory access time.

Finally, although not illustrated, the data and code stored in the memory 16' can be further protected from reverse engineering by filling unused address space within the memory 16' with randomly generated noise. The process of filling the unused space within the memory 16' limits a competitor's ability to compare a before and after dump of the memory 16' and determine those bits of data that have been changed. Thus, it minimizes a competitor's ability to determine the location and function of the changed data, since the competitor will be unable to distinguish data changes that are functional from data changes that are non-functional.

Although particular embodiments of the invention have been described in detail, it is understood that the invention is not limited correspondingly in scope, but includes all changes, modifications and equivalents coming within the spirit and terms of the claims appended hereto. For example, as opposed to using the signals provided from the set button and the cancel button of the cruise control system, the signal from the brake pedal or the automatic transmission gear indicator could be used to enable a user to access the enhanced features of the control unit 30.

What is claimed is:

1. A memory system for limiting access of a protected portion of a memory to a predetermined accessing device, comprising:
   (a) a memory having a protected portion; and
   (b) a control unit in communicative relation with an accessing device and the memory, wherein the control unit monitors a pattern of access to the memory of the accessing device in order to determine if the accessing device is the predetermined accessing device and permits only the predetermined accessing device to access the protected portion of the memory.

2. A system according to claim 1, further comprising:
   (a) a data multiplexer in communicative relation with the control unit and the accessing device; and
   (b) an address translator in communicative relation with the accessing device and the memory.

3. A system according to claim 2, wherein the memory is encrypted.

4. A system according to claim 3, further comprising a memory decryptor in communicative relation with the address translator, the data multiplexer, and the memory.

5. A system according to claim 1, wherein the control unit monitors the accessing device's reads of the memory.

6. A system according to claim 1, wherein the control unit monitors the accessing device's writes to the memory.

7. A system according to claim 1, wherein the predetermined accessing device is an engine control unit of an automobile.

8. A system according to claim 1, wherein the memory is selected from a group consisting of Flash memory, ROM, OTP, and RAM.

9. A system according to claim 1, wherein the memory system is implemented on a single integrated circuit.

10. An enhanced module chipping system for use in conjunction with an engine control unit of an automobile comprising:
    (a) a memory having loaded thereon at least one performance profile for the engine control unit to run;
    (b) a control unit in communicative relation with the memory; and
    (c) an interface port in communicative relation with the control unit and the memory, wherein the interface port is configured for connection to a programming device for modifying the at least one performance profile.

11. A system according to claim 10, wherein the memory has loaded thereon a plurality of performance profiles.

12. A system according to claim 11, wherein the engine control unit selects one of the plurality of performance profiles to run based upon input from a user.

13. A system according to claim 10, wherein the interface port is configured for connection to diagnostic equipment.

14. A system according to claim 10 further comprising:
    (a) a data multiplexer in communicative relation with the control unit and the memory; and
    (b) an address translator in communicative relation with the memory.

15. A system according to claim 10, wherein the memory is selected from a group consisting of Flash memory, ROM, OTP, and RAM.

16. A system according to claim 10, wherein the memory is encrypted.

17. A system according to claim 16, further comprising a memory decryptor in communicative relation with the address translator, the data multiplexer, and the memory.

18. A method of modifying performance characteristics of an automobile that includes a subsystem for performing a predetermined function, the method comprising:
    (a) modifying data stored in a memory of an engine control system; and
    (b) reprogramming the subsystem of the automobile such that the subsystem is capable of both performing the predetermined function and controlling access of the engine control unit to the modified data.

19. A method according to claim 18, wherein the subsystem is the cruise control system.

20. A method according to claim 19, wherein the cruise control system is used to provide a security code to the engine control unit.

* * * * *